March 17, 1970     R. T. J. SKINNER     3,500,851

FLUID FLOW CONTROL DEVICES

Filed Oct. 9, 1967

Inventor
Robert Thomas John Skinner
By Hancock Downing & Seebald
Attorneys

United States Patent Office 3,500,851
Patented Mar. 17, 1970

3,500,851
FLUID FLOW CONTROL DEVICES
Robert Thomas John Skinner, Kenilworth, England, assignor to Joseph Lucas (Industries) Limited, Birmingham, England
Filed Oct. 9, 1967, Ser. No. 673,862
Int. Cl. F15c *1/18*
U.S. Cl. 137—81.5    2 Claims

ABSTRACT OF THE DISCLOSURE

A fluid flow control device comprises a discharge nozzle and an aligned receiving nozzle, the discharge nozzle having two feed passages, one of which is arranged to produce a laminar jet and the other being arranged to disturb such laminar flow, and there being means for varying the proportion of flow to the feed passages and thus the flow pattern emitted, and hence the proportion of the total flow received in the receiving nozzle.

---

This invention relates to fluid flow control devices comprising a discharge nozzle from which in use fluid issues towards a receiving nozzle, and means whereby the proportion of the flow from the discharge nozzle received by the receiving nozzle can be varied.

In known constructions, a knife can be moved into the flow path between the nozzles to deflect a proportion thereof, thereby varying the pressure obtaining in the receiving nozzle.

The object of the invention is to provide a convenient alternative or additional means for varying the proportion of the flow entering the receiving nozzle.

In accordance with the present invention a fluid flow control device comprises a discharge nozzle in which are defined two feed passages for fluid, one of which is arranged to produce a straight jet and the other of which is arranged to disturb said straight jet, and an aligned receiving nozzle, and means for varying the proportion of the flow through the two feed passages respectively, thus varying the form of the issuing jet to vary the proportion of the flow which will enter the receiving nozzle.

Figure 1:
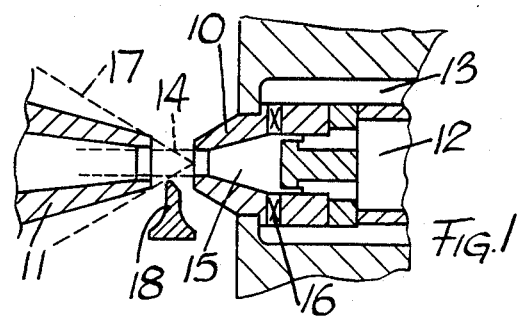
Figure 2:
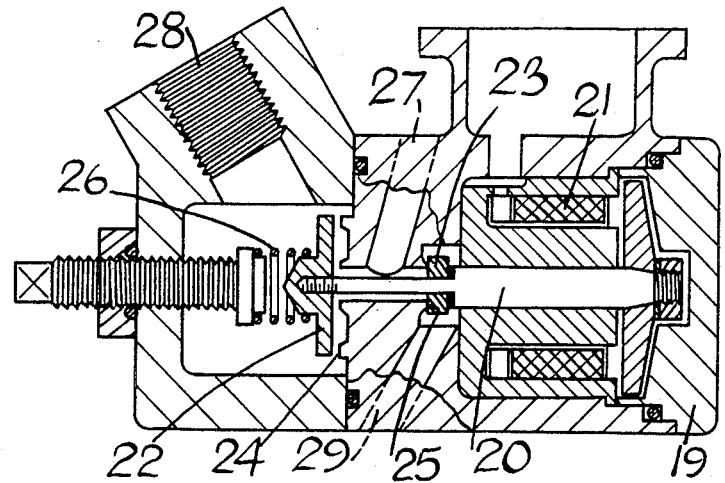
Figure 3:
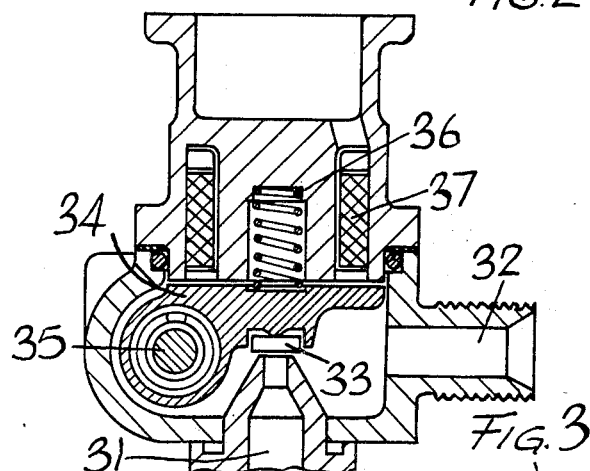

The invention will now be described by way of example with reference to the accompanying drawings in which:

FIGURE 1 is a cross-sectional view of a device constructed in accordance with the invention, and FIGURES 2 and 3 show alternative means whereby the flow to the device in FIGURE 1 can be controlled.

Referring to FIGURE 1 the device shown comprises a discharge nozzle 10 and a receiving nozzle 11, these two nozzles being disposed in alignment with one another, so that fluid flow leaving the discharge nozzle 10 will enter the receiving nozzle 11. The device may be used in any form of apparatus in which the receiving nozzle 11 is connected to a device requiring a fluid pressure signal. This can be varied in accordance with any chosen parameter or manually as required.

The discharge nozzle 10 has two fluid flow feed passages defined therein and indicated at 12 and 13 respectively. The flow of fluid through the passage 12 produces a substantially linear discharge jet as indicated by the dotted lines 14 substantially the whole of the flow being received in the receiving nozzle 11.

If however fluid also flows through the feed passage 13, this linear flow will be disturbed in a chamber 15 defined within the discharge nozzle 10, since fluid from the passage 13 enters this chamber 15 through tangential openings 16, thus creating a swirling motion of the fluid inside the chamber 15. When both feed passages 12, 13 are supplied with fluid, discharge of the fluid occurs in the shape of a hollow cone, as indicated by the dotted lines 17.

By controlling the proportions of the flow entering the discharge nozzle 10 through the two feed passages 12 and 13 respectively, the proportion of the total flow entering the receiving nozzles 11 can be varied, and thus the pressure signal therein.

Additionally a knife 18 is movable towards and away from the path of flow of fluid between the nozzles 10 and 11. If the knife intersects the path of flow, it will cause a proportion to be deflected, the position of the knife 18 thus determining the proportion which is deflected from entering the receiving nozzle 11 if the supply to the feed passage 12 or to the feed passages 12, 13 is maintained constant. It is however to be understood that the knife 18 may be omitted, control being wholly obtained by the proportioning of the flow through the feed passages 12 and 13 in the discharge nozzle 10.

FIGURE 2 shows one form of means whereby the proportions of the flow entering the discharge nozzle 10 through the two feed passages 12 and 13 can be varied, this means comprising a body 19 in which is disposed a slidable plunger 20, the position of which is controlled by an electrical solenoid 21. The plunger carries a pair of valve members 22, 23 engageable with respective seatings 24, 25 disposed in the body 19, the seatings being presented in opposite directions respectively, and the plunger being loaded by a spring 26 for moving it in a direction in opposition to the action of the solenoid 21.

In use, fluid enters through a passage 27 and can be discharged through either of a pair of outlets 28, 29, the former being connected to the feed passage 13, and the latter being connected to the feed passage 12. It will be clear that the position of the plunger 20 which is determined by the current flowing in the electrical solenoid 21 determines the proportion of the flow entering the feed passages 12 and 13, thus controlling the form of the discharge jet from the discharge nozzle 10, and thus controlling the pressure in the receiving nozzle 11 of the device.

The device illustrated in FIGURE 3 is arranged to control the flow to the feed passage 13 of the device by providing a bleed from the associated system supplying fluid to the feed passage 12. Fluid enters a body 30 through an inlet 31, and can be discharged through an outlet 32 connected to the feed passage 13. The flow therethrough is in accordance with the opening of a valve having a closure member 33 which is carried by an arm 34 pivotally mounted at 35 on the body 30. The arm 34 is loaded by a spring 36 and is controlled by an electrical solenoid 37. With this arrangement, the current flowing in the electrical solenoid 27 determines the opening of the valve 33, and thus the proportion of the flow which is bled to the feed passage 13 of the device. The flow to the passage 12, in this case does not take place through the body 30.

Having thus described my invention what I claim as new and desire to secure by Letters Patent is:

1. A fluid flow control device comprising a discharge nozzle in which are defined two feed passages for fluid, one of which is arranged to produce laminar flow and the other of which is arranged to disturb said laminar flow, and an aligned receiving nozzle, means for varying the proportion of the flow through the two feed passages respectively, thus varying the form of the issuing jet to vary the proportion of the flow which will enter the receiving nozzle, and a knife arranged adjacent to the nozzles and movable towards a path of fluid flowing between nozzles, to further disturb the flow between them.

2. A fluid flow control device as claimed in claim 1 in which the means for varying the proportion of the flow through the two feed passages comprises a pair of valves, arranged to control supply of fluid to the feed passages respectively, and an electrical solenoid connected to the two valves.

References Cited
UNITED STATES PATENTS

| | | | |
|---|---|---|---|
| 3,022,799 | 2/1962 | Padula | 251—139 XR |
| 3,039,490 | 6/1962 | Carlson | 137—81.5 |
| 3,219,048 | 11/1965 | Palmisano | 137—81.5 |
| 3,223,103 | 12/1965 | Trinkler | 91—3 XR |
| 3,272,215 | 9/1966 | Bjornsen et al. | 137—81.5 |
| 3,276,463 | 10/1966 | Bowles | 137—81.5 |
| 3,336,931 | 8/1967 | Fox et al. | 137—81.5 |
| 3,351,080 | 11/1967 | Datwyler et al. | 137—81.5 |
| 3,362,421 | 1/1968 | Schaffer | 137—81.5 |
| 3,403,692 | 10/1968 | Shiiki | 137—81.5 |

SAMUEL SCOTT, Primary Examiner

U.S. Cl. X.R.

137—610